United States Patent [19]

Tateisi et al.

[11] Patent Number: 4,602,149

[45] Date of Patent: Jul. 22, 1986

[54] TRANSACTION PROCESSOR

[75] Inventors: Kazuma Tateisi; Masanori Nagata, both of Kyoto; Mamoru Hirayama, Takatsuki, all of Japan

[73] Assignee: Omron Tateisi Electronics Co., Kyoto, Japan

[21] Appl. No.: 517,380

[22] Filed: Jul. 26, 1983

[30] Foreign Application Priority Data

Aug. 7, 1982 [JP] Japan ................................ 57-137481

[51] Int. Cl.[4] .............................................. G06F 15/30
[52] U.S. Cl. .................................................... 235/379
[58] Field of Search ........................................... 235/379

[56] References Cited

U.S. PATENT DOCUMENTS 3,973,237 8/1976 Sawaguchi .......................... 235/379

*Primary Examiner*—Harold I. Pitts
*Attorney, Agent, or Firm*—Stevens, Davis, Miller & Mosher

[57] ABSTRACT

A deposit mode for inserting cash into an inserting opening for cash deposit and an envelope deposit mode for putting cash into an envelope and inserting the envelope into an opening for deposit are selectively set by a transaction mode setting unit. In the cash deposit mode, acceptance of cash inserted into the inserting opening for deposit is judged by a judgement unit. A deposit mode processing unit is provided to effect deposit processing for acceptable cash and to effect return processing for unacceptable cash which is not capable of being transacted, in accordance with the result of the judgement. An inquiry is made by a display unit to a depositor concerning whether or not returned money will be deposited in an envelope. In the envelope deposit mode, a request instructing unit instructs a client to input a value for an amount of cash to be placed into an envelope. Deposit processing based on the requested amount and processing of accepting the inserted envelope are effected by an envelope deposit mode processing unit.

8 Claims, 4 Drawing Figures

TRANSACTION PROCESSOR

BACKGROUND OF THE INVENTION

This invention relates to a transaction processor in which cash such as notes, checks and the like can be deposited by inserting them into an inserting opening, and cash can also be deposited in a state wherein cash is put into an envelope.

As is well known, automatic deposit apparatus installed in financial instructions such as banks include various devices, such as for example, a note exclusive-use machine, a check exclusive-use machine or a machine which can handle notes and checks. In any of these machines, cash such as notes, checks or the like inserted is checked for genuineness. A standard of judgement for genuineness is whether or not, in case of a note, a note read-in apparatus can read it, or whether or not, in case of checks, a character read-in apparatus can read it. In the case of notes, when printing on notes is obscure or notes are bent, such as notes are sometimes judged to be defective or bad. On the other hand, in case of checks, if it is hand-written, mis-judgement sometimes occurs.

A conventional transaction processor is designed so that if notes or checks to be deposited by a client, are judged as defective such a deposit is collectively returned to the client so as not to accept the deposit. If rejection of acceptance is caused by a bend of the notes or checks, such a bend is corrected properly and notes or checks are re-inserted, then the expected deposit can be made and therefore, a problem hardly occurs. However, if rejection of acceptance is caused by the reading ability of the machine such as obscure printing, a client cannot make his expected deposit, thus posing a problem. In such a case, the client has to carry cash to a bank-counter to request a staff member to execute a deposit procedure.

This significantly impairs introduction of the machine and imposes an additional burden on the staff.

BRIEF SUMMARY OF THE INVENTION

It is an object of this invention to provide a transaction processor in which cash put into an envelope can be deposited in addition to the deposit of cash such as notes, checks or the like.

In accordance with the present invention, among cash to be deposited by a client, those which are acceptable are processed for deposit immediately, and those which are unacceptable are returned. At that time, the client can put the returned cash into an envelope for deposit. That is, the client can deposit all cash, which are expected to be deposited at the outset, as expected, thereby greatly enchancing services for clients. Since, at this time, processing made by a staff is directed to only cash which cannot be processed by the machine, a burden on the staff is relieved.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
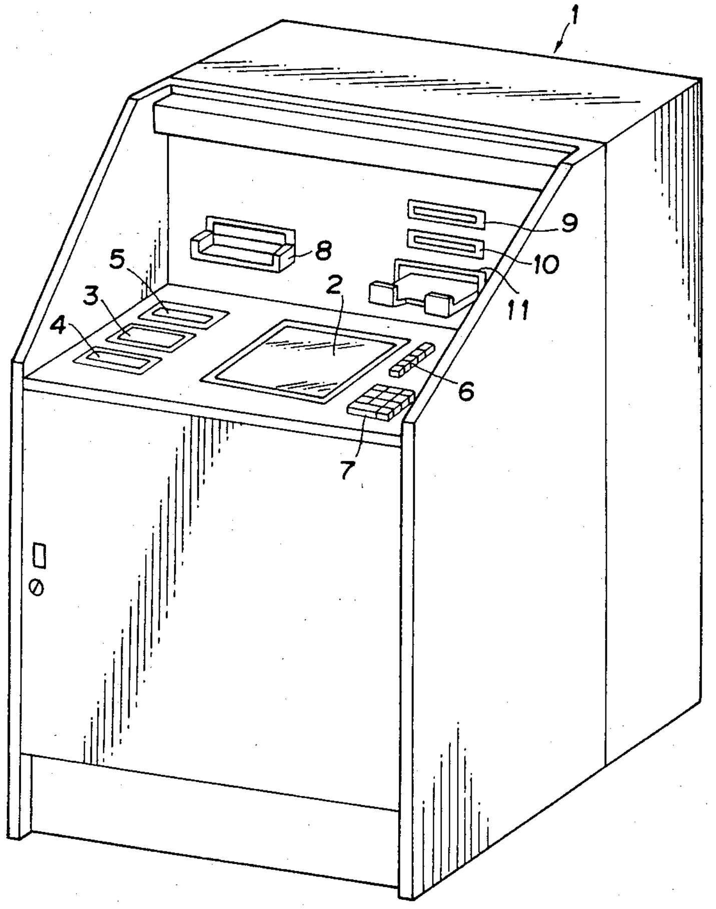
FIG. 1 is an external view showing a transaction processor as one embodiment of the present invention.

In FIG. 1, an operating section which carries out transactions is arranged in a front surface of a transaction processor 1. A display 2 is arranged approximately in a central portion of a horizontal panel of said operation section, which display 2 is provided to display, to an operator, a message, amount and the like required for a transaction. To the left of the display 2 are arranged a note inserting opening 3 through which notes are inserted, a note returning opening 4 thorugh which notes, which cannot be read in the deposit mode, are returned, and a check inserting opening 5 through which checks are inserted. To the right of the display 2 are arranged a function key 6 for effecting setting of modes or the like and ten key keyboard 7 for entering numeric information. In a vertical panel of the operating section are arranged a bank-book inserting opening 8, a card inserting opening 9, an envelope inserting opening 10 through which an envelope having notes or checks put therein is inserted in an envelope deposit mode, and a chit issuing opening 11 for issuing various chits such as a deposit chit, a chit for a detailed statement of deposit amount or a chit for a receipt of envelope, etc. requested in an envelope deposit mode.

Figure 2:
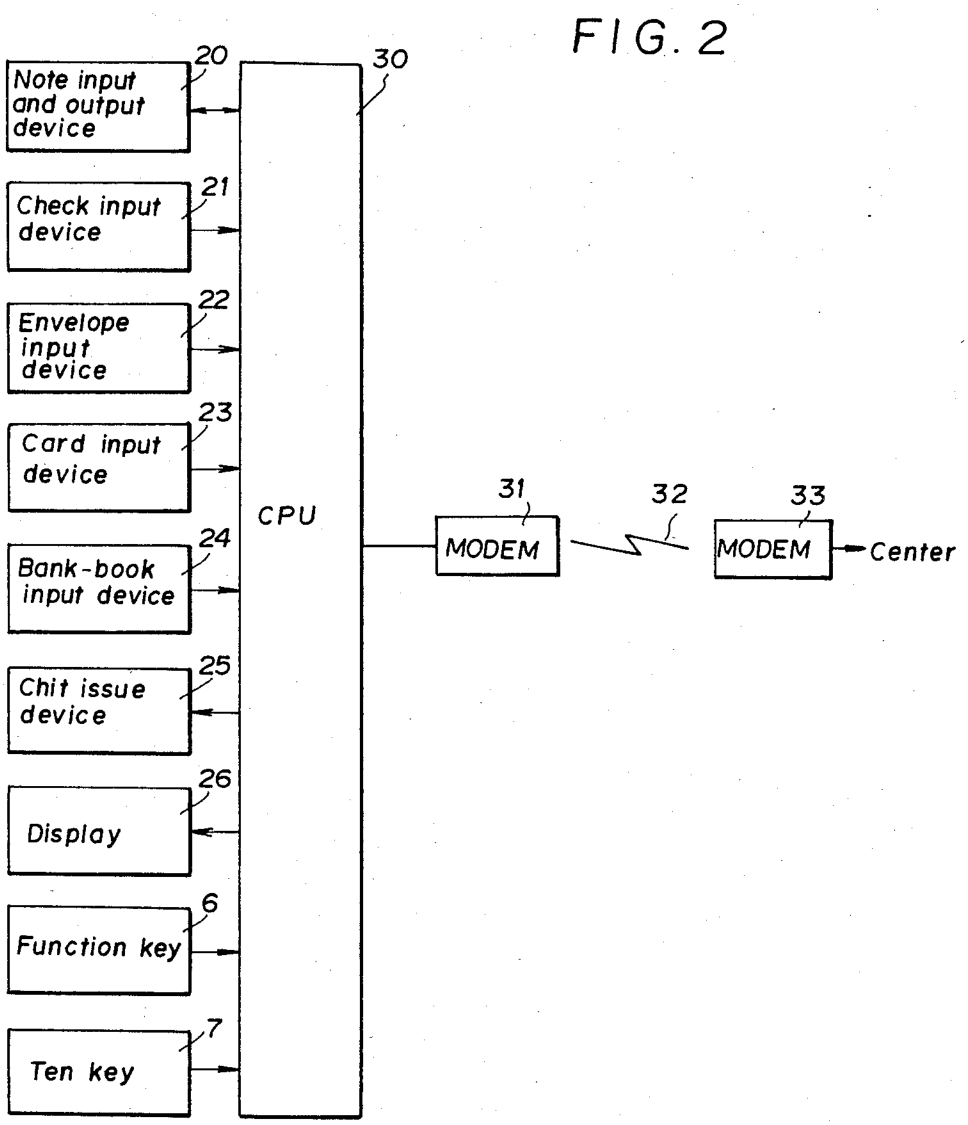
FIG. 2 is a schematic block diagram showing a fundamental electric structure of apparatus in said embodiment.

FIG. 2 shows a fundamental structure of the aforesaid transaction apparatus.

A note input and output device 20 includes said note inserting opening 3 and note returning opening 4, and receive notes inserted into the note inserting opening 3 one by one to judge the genuineness, kind and number of notes, whereby those which have been accurately read as true notes are stacked on a stacker not shown, and those which have not been accurately read, among forged notes and true notes, are returned to the note returning opening 4. A check input device 21 includes the check inserting opening 5 to read various kinds of checks inserted, hand-written amount and the like, whereby those which have been accurately read in all information required for transaction as true checks are stacked on a stacker not shown, and those which have not been accurately read in forged checks and information required for transaction of hand-written amount and the like are returned to the inserting opening 5. Data read by the note input and output device 20 and check input device 21 are entered into CPU 30. An envelope input device 22 includes the envelope inserting opening 10, and when an envelope having notes or checks put therein is inserted, said envelope is transferred to an envelope stacker not shown. A card input device 23 includes the card inserting opening 9 to read information such as account number, bank number and the like magnetically recorded on the card, which information is put into CPU 30. A bank-book input device 24 includes the bank-book inserting opening 8 for reading information recorded on a magnetic stripe of the inserted bank-book by means of a magnetic head and optically reading a page mark and a print mark, which information is put into CPU 30. The page mark and print mark are checked to determine a next printing position. This is well known, details of which therefore will not be described. A chit issuing device 25 includes the chit issuing opening 11 to print predetermined information in connection with a transaction on a sheet of recording paper on the basis of command of CPU 30 and issue the printed recording paper as a transaction chit. A display device 26 includes a display portion 2 for displaying a message and amount required for operation of a transaction for a client. The function key 6 includes a key for setting transaction modes to a deposit mode which uses a card or a bank-book, an envelope deposit mode which uses an envelope or other modes, a key to designate if deposit is made by notes or checks, and a confirmation key for confirming a deposited amount, in which outputs of keys operated are effectively put in when the CPU 30 is in a key input waiting state. In this embodiment, the deposit mode is classified into a card deposit mode which uses a card and a bank-book deposit mode which uses a bank-book. A ten key keyboard 7 is provided to input predetermined numeric information required for a transaction in response to the message displayed on the aforesaid display 2, and outputs of operated keys are effectively put in when the CPU 30 is in a key input waiting state.

The CPU 30 transfers data between the aforesaid I/O devices to prepare transaction data to be transmitted to the center for every transaction. Said transaction data are put on a transmission line 32 by MODEM 31 and is sent to the center through MODEM 33 arranged in the center section. The CPU 30 includes a ROM which stores the control procedure for controlling the aforesaid I/O devices and the control procedure for transmitting the transaction data to the center, and a RAM to which work areas, flags and the like required for processing data are assigned.

Figure 3A:
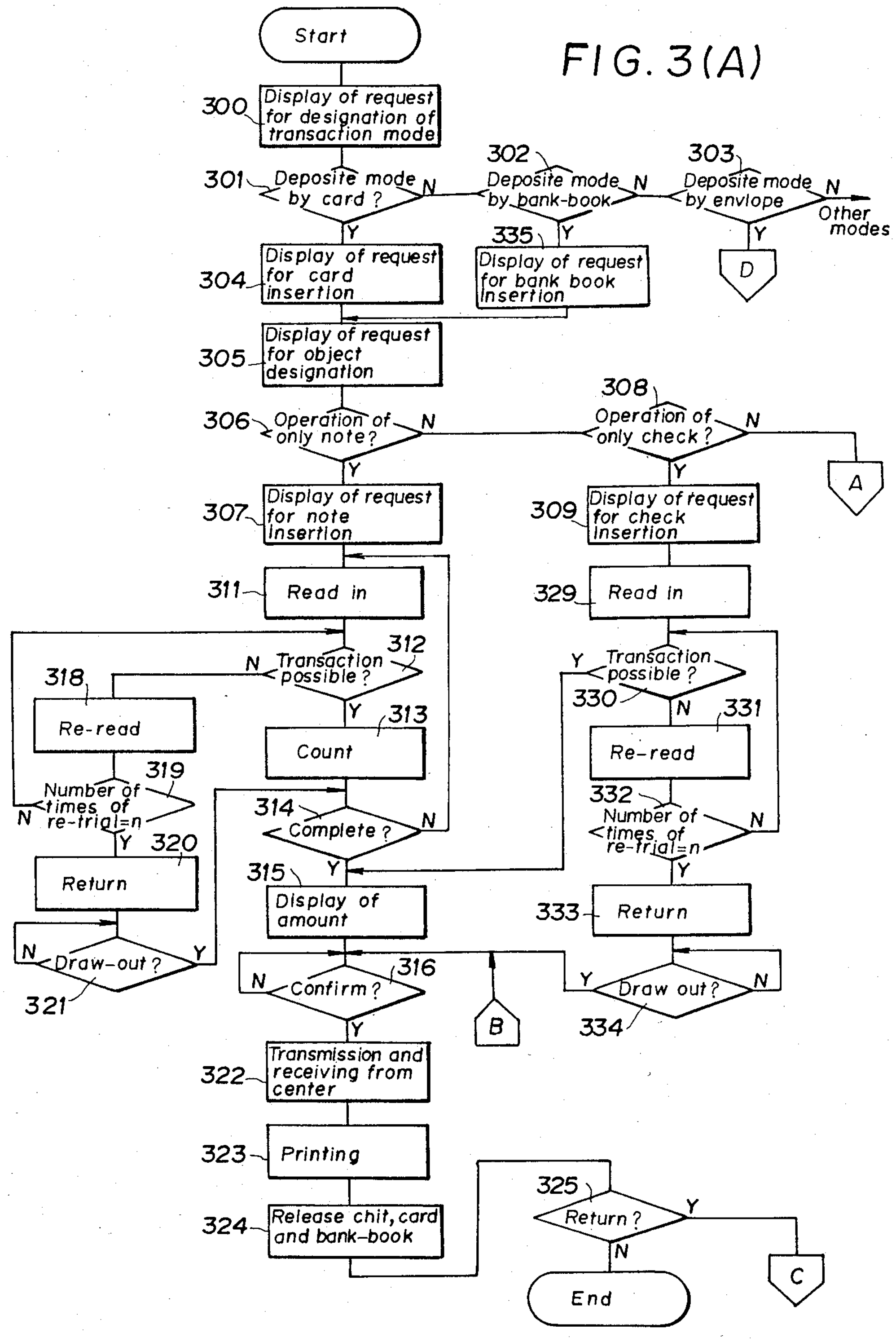
FIGS. 3(A) and 3(B) are flow charts showing control operation of said apparatus, principally showing parts related to the present invention.
Figure 3B:
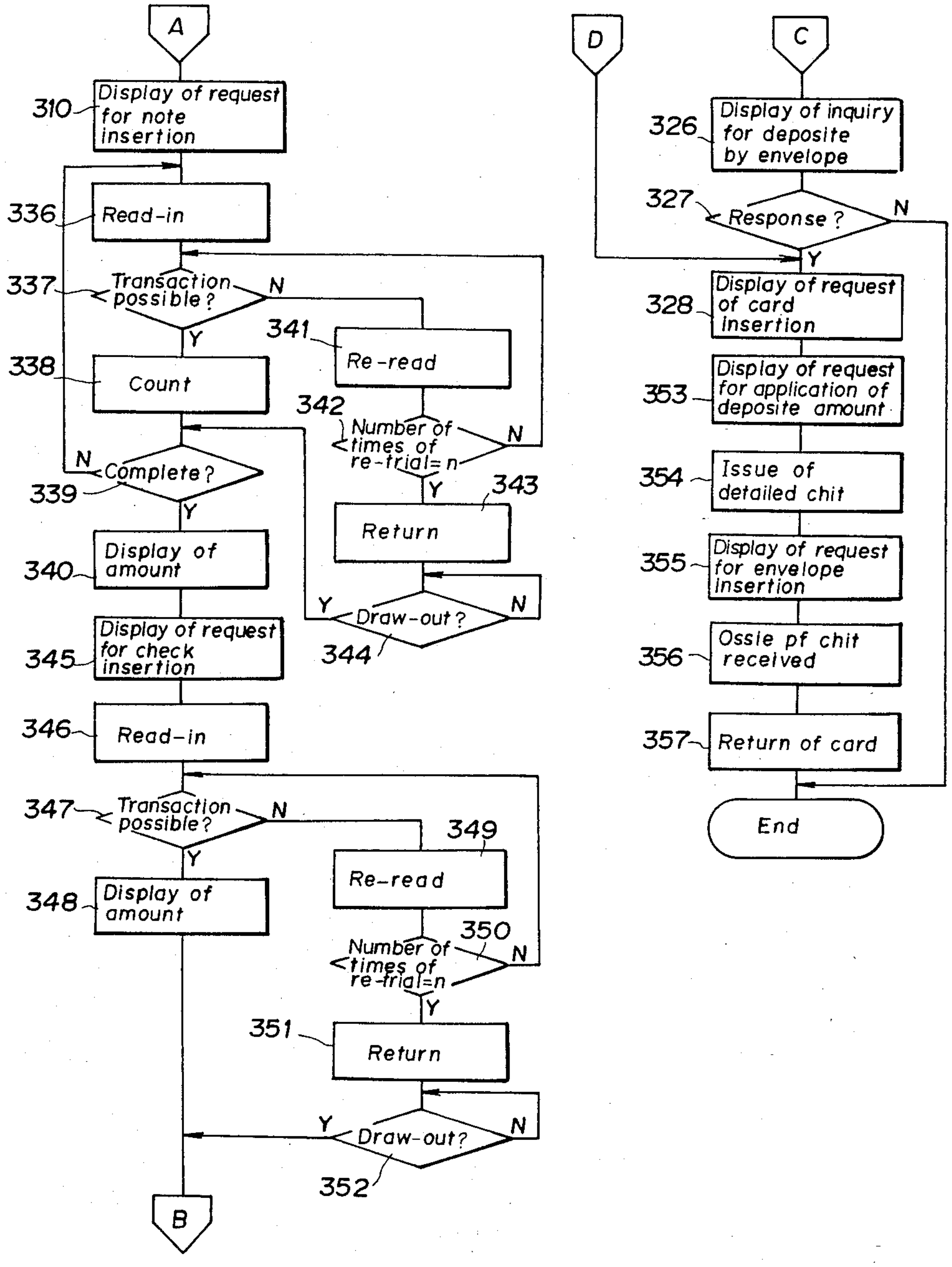

Next, among control operations of the CPU 30, operation of each of the deposit mode and envelope deposit mode will be described with reference to a flow chart shown in FIG. 3.

When a power source is closed to initialize the CPU 30, the CPU 30 displays "Operate the function key 6" on the display 2 (Step 300) to form a key input waiting state of the function key 6. When the key is operated in the function key input waiting state, the transaction mode is set in response to the thus operated key. As a result, when the transaction mode is in the card deposit mode, the step proceeds to Step 301; when in the bank-book deposit mode, the step proceeds to Step 302; and when in the envelope deposit mode, the step proceeds to Step 303.

First, the case where the transaction mode is set to the deposit mode will be described.

In Step 304, the CPU 30 displays "Insert a card" on the display 2. In this stage, only the card input device among the various input devices is effectively actuated but other input devices are not actuated. Thus, insertion of bank-book or the like is not possible. When the card is inserted, the card input device 23 reads information magnetically recorded on the inserted card to release the read data to the CPU 30. The CPU 30 prepares a column of data required to initiate a transaction such as account number, bank number, etc. to be sent to the center on the basis of said read data to store them in a predetermined storage region within the RAM and to display a request for designation of an object for deposit, that is, "Designate if deposit is notes or checks" (Step 305). If the client operates the note key among the function keys, the step proceeds to Step 306 and 307; if operates the check key, the step proceeds to Step 308 and 309; and if operates both the note key and check key, the step proceeds to Step 310. That is, the CPU 30 displays "Insert notes" on the display 2 if the step proceeds to Step 307; displays "Insert checks" if the step proceeds to Step 309; and displays "First, insert notes" if the step proceeds to Step 310.

When notes or checks are inserted in a manner as described above, processing necessary for a transaction will begin.

In case of the card deposit mode, when only the note key is operated, only the note inserted is read in Step 311. This reading of the note is carried out by the note input and output device 20. The note input and output device 20 further judges the genuineness and kind of notes from the thus read data or data set and stored in RAM and ROM (Step 312). If the true notes and kind thereof are accurately read, said notes are transferred to the stacker not shown, and values in the amount storage region within the RAM are counted and stored as a deposit amount by adding only an amount deposited (Step 313). It is noted that the amount storage region which stores values counted in Step 313 is reset to zero upon completion of one transaction. Subsequently, inspection is made if processing of reading notes one by one has completed on all notes inserted into the note inserting opening 3 (Step 314). This inspection is carried out by detection that a note detection signal from a photoelectric switch (not shown) provided on a transfer passage which transfers notes, which are inserted into the note inserting opening 3, one by one has been stopped for a given period of time, or by detection that a photoelectric switch, not shown, which detects notes present in the note inserting opening 3 has failed to detect notes. In the case that all the inserted notes are true and can be read at once, processing of the aforesaid Step 311 to 314 are repeated through the number of notes inserted. The deposited amount is displayed (Step 315) and the step proceeds to Step 316. On the other hand, when forged notes or notes which are poor in printing accuracy and difficult to read are present, such notes are again read in Steps 312 and 318. The result obtained therefrom is again judged in Step 312. This re-reading is executed through a number of times, which are predetermined n times (for example, three times). If the notes can be accurately judged as the true notes as well as the kind thereof during that time, said notes are processed for deposit in Step 313. The number of judgements is counted by adding, by one, counted values in the storage region for storing the number of times within the RAM every time the step proceeds from Step 312 to Step 318. And, in Step 319, inspection is made if the counted value in the storage area for storing the number of times is equal to n times (for example, 3 ). When notes are judged to be forged notes or to be impossible to read by re-reading them n times, said notes are returned to the note returning opening 4 (Step 320), and when the client has picked up the thus returned notes (Step 321), the step proceeds to Step 314. When notes are judged to be true in the judgement of step 312 or when removal of notes is detected by means of a photoelectric device not shown in step 321, the stored value in the storage region for storing the number of times is reset to zero. In this manner, all the inserted notes are judged in Step 312 to accept only notes which can be transacted for counting processing (Step 313). When the client has confirmed the amount displayed on the display 2 (which is the amount accepted as transactable notes) after the aformentioned processing has been finished and the confirmation key within the function key 6 is operated (Step 316), data are transferred to and from the center (Step 322). Then, transacted data are printed on a sheet of recording paper on the basis of data received from the center (Step 323) and the chit and card are released (Step 324). When the client removes the chit out of the chit issuing opening 11 and removes the card out of the card inserting opening 9, the CPU 30 judges the presence or absence of the returned notes (Step 325). As a result, if the returned notes are presented, "Do you want to deposit returned notes in envelope?" is displayed (Step 306), and if returned notes are not present, the step terminates. And, when the envelope deposit mode setting key within the function key 6 is operated, the step proceeds to Step 328, and if the envelope deposit mode setting key is not operated within a given period of time, the step terminates.

If, in the card deposit mode, only the check key is operated (Step 308), and a check is inserted into the check inserting opening 5 in Step 309, reading of the check is first executed in Step 329 in a manner similar to the case of notes. This reading is carried out by the check input device 21. The check input device 21 judges, in its reading, if the check is true and if the amount described in an amount column can be read accurately (Step 330). As the result, if the check is true and the amount can be read accurately, the step proceeds to Step 315 to display the amount. If the check is found to be a forged check or the described amount cannot be read accurately, re-reading is tried through a maximum of n times exactly in the same manner as in the case of notes (Steps 331 and 332). If reading was made during that period, the read amount is added to the stored value in the amount storage region within the RAM, and the step proceeds to Step 315 and otherwise the check is returned in Step 333. If the check is removed in Step 334, processing of each of the afore-mentioned Steps 316 to 327 is executed. It is noted that the stored value in the amount storage region is reset every time the transaction terminates. In Step 326, "Do you want to deposit a returned check in envelope?"is displayed on the display 2.

Next, where the bank-book deposit mode is set (Step 302), the display 2 displays "Insert a bank-book" (Step 335), and the step proceeds to Step 305. Thereafter, the above described Steps are executed. It is noted in Step 323 that transacted data are printed on the bank-book but a chit is issued if necessary. In Step 314, the bank-book and necessary chits are released.

On the other hand, in the card deposit mode or bank-deposit mode, both the note key and check key are operated, that is, when the step proceeds to Step 306→308→310, processing for notes is first carried out in Steps 336 to 344 in a manner similar to the above described manner. Next, the CPU 30 displays "Insert a check" on the display 2 (Step 345), and when the client inserts a check into the check inserting opening 5, processing for the check is carried out in Steps 346 to 352 similiarly to the former.

Next, the operation in which the envelope deposit mode is set will be described.

When the envelope deposit mode setting key is operated in Step 327 or in the first Step 300, the step proceeds to Step 328 and "Insert a card" is displayed on the display 2 to wait for insertion of the card by the client. When the client inserts the card, "Request to deposit an amount to be put into an envelope" is displayed on the display 2 (Step 353). Thereby the client inputs a total amount of notes and/or checks to be put into envelope from the ten key 7 to effect request to deposit the amount to be put into an envelope. When this request is made, a detailed chit, on which data such as an amount based on the request and the account number read from the card are recorded, is issued from the chit issuing opening (Step 354). Subsequently, in Step 355, "Insert an envelope into an envelope inserting opening" is display 2. When the envelope is inserted, a receipt chit indicative of the fact that the envelope has been received, is issued from the chit issuing opening 11 (Step 356). At the same time, the card is returned (Step 357). The step terminates when the card and receipt chit are removed.

While in the above-described embodiment, it is possible to deposit both notes and checks as well as to use an envelope deposit therefor, it should be noted that in case where notes are high in precision and misreading hardly occurs, the envelope deposit for only checks can be made.

In addition, it is needless to say that the present invention may be applied even to apparatus which can handle only the note deposit, apparatus which can handle only the check deposit, apparatus which can use only card or apparatus which can use only the bank-book.

What is claimed is:

1. A transaction processor comprising:

a transaction mode setting means for selecting either a cash deposit mode in which cash is to be directly deposited into the processor or an envelope deposite mode in which cash placed into an envelope is to be deposited into the processor;

a judgement means for receiving, checking and accepting cash directly deposited by a depositor when said deposit mode is selected by said transaction mode setting means, said judgement means returning to said depositor cash which is judged to be unacceptable; and a deposit mode processing means for executing a deposit processing procedure for cash which has been judged to be acceptable by said judgement means and for executing a cash return processing procedure for returning to a depositor cash which is judged to be unacceptable by said judgement means.

2. A transaction processor of claim 1, comprising a request instructing means for instructing a depositor, when said envelope deposit mode is selected by said transaction mode setting means, to input an amount of cash to be placed into a deposit envelope by a depositor;

input means operable by a depositor to input a numerical amount corresponding to an amount of cash to be placed in a deposit envelope; and an envelope deosit mode processing means for executing a deposit processing procedure on the basis of the numerical amount input by a depositor and to accept an envelope inserted into an envelope inserting opening.

3. A transaction processor of claim 1, comprising a display means for displaying an inquiry concerning whether or not unacceptable cash returned to a depositor will be placed in a deposit envelope for deposit.

4. A transaction processor of claim 1, wherein said deposit mode processing means operates to effect said deposit processing procedure in accordance with information recorded on a card.

5. A transaction processor of claim 1, wherein said deposit mode processing means operates to effect said deposit processing procedure in conjunction with bankbook information.

6. A transaction processor according to any one of claims 1, 2, 3, 4 and 5, wherein said cash comprises one of a note and a check.

7. A transaction processor according to any one of claims 1, 2, 3, 4 and 5, wherein said cash comprises only a note.

8. A transaction processor according to any one of claims 1, 2, 3, 4 and 5, wherein said cash comprises only a check.

* * * * *